United States Patent
Sheehan

(10) Patent No.: US 9,212,828 B2
(45) Date of Patent: Dec. 15, 2015

(54) EPICATALYTIC THERMAL DIODE

(71) Applicant: Daniel P. Sheehan, San Diego, CA (US)

(72) Inventor: Daniel P. Sheehan, San Diego, CA (US)

(73) Assignee: Paradigm Energy Research Corporation, San Diego, CA (US)

( * ) Notice: Subject to any disclaimer, the term of this patent is extended or adjusted under 35 U.S.C. 154(b) by 9 days.

(21) Appl. No.: 14/289,322

(22) Filed: May 28, 2014

(65) Prior Publication Data

US 2014/0352682 A1 Dec. 4, 2014

Related U.S. Application Data

(60) Provisional application No. 61/828,421, filed on May 29, 2013.

(51) Int. Cl.
| | |
|---|---|
| *F24J 1/00* | (2006.01) |
| *F28F 23/00* | (2006.01) |
| *F28D 15/00* | (2006.01) |
| *B01J 15/00* | (2006.01) |

(52) U.S. Cl.
CPC . *F24J 1/00* (2013.01); *F28D 15/00* (2013.01); *F28F 23/00* (2013.01); *B01J 15/005* (2013.01)

(58) Field of Classification Search
CPC ..................................................... B01J 15/005
USPC ..................................................... 126/263.01
See application file for complete search history.

(56) References Cited

U.S. PATENT DOCUMENTS

| | | |
|---|---|---|
| 4,425,876 A | 1/1984 | Rutledge et al. |
| 6,924,249 B2 | 8/2005 | Smith et al. |
| 7,070,634 B1 | 7/2006 | Wang |

OTHER PUBLICATIONS

Challenges to the Second Law of Thermodynamics, Capek et al., 2005.*
Capek, V. et al., "Challenges to the Second Law of Thermodynamics," *Fundamental Theories of Physics Series*, Aug. 28, 2014, Chapter 7, pp. 211-237 and Chapter 10, p. 305, vol. 146.
PCT International Search Report and Written Opinion, PCT Application No. PCT/US2014/040089, Oct. 17, 2014, twelve pages.
Sheehan, D.P. et al., "Experimental Test of a Thermodynamic Paradox," *Foundation of Physics*., Mar. 2014, pp. 235-247, vol. 44.
Sheehan, D.P. et al., "Nonequilibrium heterogeneous catalysis in the long mean-free-path regime," *Physical Review E*, 2013, pp. 032125-1 to 032125-12.
Sheehan, D.P. et al., "Steady-state nonequilibrium temperature gradients in hydrogen gas-metal systems: challenging the second law of thermodynamics," *Physica Scripta*, seven pages.

* cited by examiner

*Primary Examiner* — Kenneth Rinehart
*Assistant Examiner* — Gajanan M Prabhu
(74) *Attorney, Agent, or Firm* — Fenwick & West LLP

(57) ABSTRACT

An Epicatalytic Thermal Diode (ETD) includes one or more ETD cells. Each cell comprises first and second surfaces with a cavity between them, which contains a gas that is epicatalytically active with respect to the pair of surfaces. The surfaces chemically interact with the gas such that the gas dissociates at a faster rate proximate to the first surface than it does proximate to the second surface. Thus, a steady-state temperature differential between the first surface and the second surface is created and maintained. In various applications, multiple ETD cells are connected in series and/or parallel.

27 Claims, 6 Drawing Sheets

EPICATALYTIC THERMAL DIODE

CROSS-REFERENCE TO RELATED APPLICATIONS

This application claims the benefit of U.S. Provisional Patent Application No. 61/828,421, entitled "Epicatalytic Thermal Diode," filed on May 29, 2013, which is hereby incorporated by reference in its entirety.

BACKGROUND

1. Technical Field

The subject matter described herein generally relates to managing heat flow, and in particular to devices that create and maintain a steady-state temperature differential.

2. Background Information

Heat normally flows from hot to cold, relaxing away temperature gradients such that isolated systems ultimately come to a thermodynamic equilibrium characterized by a single uniform temperature. Currently, in order for a device to create and maintain a temperature gradient, work must be applied. Maintaining a temperature gradient has utility across a wide range of technological fields, such as heating, refrigeration, environmental control, power generation, and mechanical motion.

Existing devices that apply work to maintain a temperature gradient also generate waste heat. Some devices attempt to use this waste heat (e.g., waste heat generated by a vehicle engine can be directed to the vehicle's interior to provide heating during the winter months) but such systems are typically inefficient and fail to address the initial requirement of providing work, such as by burning fossil fuel (e.g., gasoline, coal, oil, etc.).

SUMMARY

The above and other problems are addressed by an Epicatalytic Thermal Diode (ETD) and corresponding method. The ETD, spontaneously: i) creates and maintains a temperature difference between two separated surfaces of the ETD; and ii) mediates efficient steady-state heat flow across the ETD, in the direction of (i.e., up) the temperature gradient. In one aspect, the structure of the ETD thermomechanically and chemically optimizes both the creation and maintenance of the temperature gradient and the flow of heat.

In various embodiments, ETD devices comprise one or more ETD cells, connected in series and/or parallel. In particular embodiments, adjacent ETD cells share one or more components for increased efficiency of operation and/or reduced production costs.

In one aspect, an ETD cell comprises first and second surfaces with a cavity between them configured to hold a gas. When the gas is present in the cavity, the surfaces chemically interact with the gas such that the gas dissociates at a faster rate proximate to the first surface than it does proximate to the second surface. Thus, a greater amount of heat is absorbed or released (depending on whether the dissociation reaction is endothermic or exothermic, respectively) proximate to the first surface than proximate to the second surface. Consequently, a steady-state temperature differential between the first surface and the second surface is created and maintained.

In another aspect, the ETD cell further comprises first and second heat transfer surfaces connected and substantially parallel to the first and second surfaces respectively. The heat transfer surfaces are connected to the side of the corresponding surface that is opposite the cavity. The heat transfer surfaces are configured to conduct heat to and/or from the corresponding surface.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Overview of Process

Figure 1A:
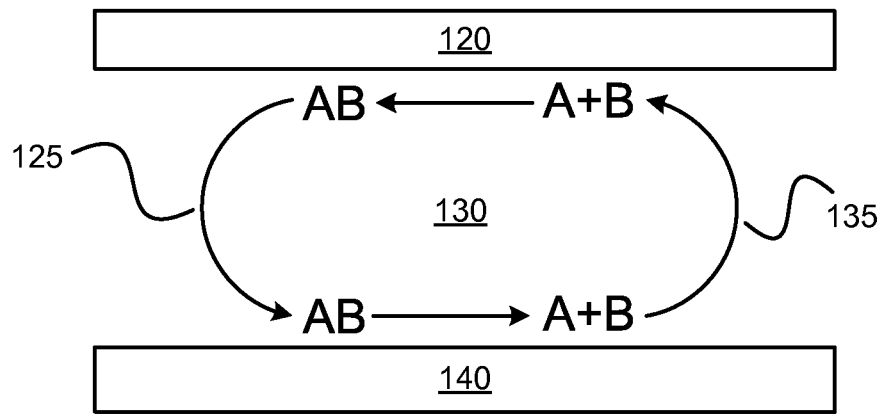
FIG. 1A is a diagram illustrating an epicatalytic reaction that results in a temperature differential between two surfaces, according to one embodiment.

Embodiments of an ETD utilize a process involving (at least) two spatially separated surfaces that are chemically active with respect to a gas enclosed between them, the gas undergoing a generic dissociation reaction $AB \leftrightarrows A+B$. FIG. 1A illustrates an embodiment of this process that uses two parallel surfaces 120 & 140. The two (or more) surfaces 120 & 140 exhibit most behaviors of traditional heterogeneous catalysts, but deviate on one standard principle of catalysis. Unlike conventional catalysts that do not shift the gas phase equilibrium, the surfaces 120 & 140 alter the gas phase equilibrium due to the dominance of surface effects over the bulk properties of the gas in the cavity 130 between the surfaces. Thus, the surfaces 120 & 140 are referred to herein as "epicatalysts" and a process based on such surfaces is referred to as "epicatalysis" and/or an "epicatalytic process."

A first one of the surfaces 140 is predisposed to the dissociation half-reaction (meaning $AB \rightarrow A+B$) compared with a second one of the surfaces 120. Conversely, the second surface 120 is comparatively predisposed to the recombination half-reaction (meaning $A+B \rightarrow AB$), relative to the first surface 140. Thus, when gas dimers are proximate to the first surface 140, the interaction between the dimers and the first surface 140 results in a dissociation rate that is higher than the corresponding dissociation rate proximate to the second surface 120. The term proximate is used herein with regards to the gas and a surface to mean that the monomers and/or dimers of the gas are within about 10 Angstroms of the surface, including being on the surface.

The cavity 130 contains the gas, which can freely move within the cavity. Thus, there is a greater flux of the A and B species of the gas across the cavity 130, from the first surface 140 towards the second surface 120, than in the opposite direction. Conversely, there is a greater flux of the AB species of the gas across the cavity 130 from the second surface 120 towards the first surface 140. Consequently, there is chemical cycle in the cavity 130 with a net flow of gas in the AB species 125 in one direction, and a net flow of gas in the A and B species 135 in the other direction. This flow of gas between the two surfaces 120 & 140 carries net thermal and chemical energy, resulting in a steady-state temperature differential between the two surfaces.

In one embodiment, the dissociation reaction is endothermic and the recombination reaction is exothermic. As a result, the surface that favors dissociation 140 spontaneously cools and maintains a lower temperature than the surface that (relatively) favors recombination 120. Should excess heat be provided to the cooler surface 140, the heat is thermally convected and chemically advected through the space 130 to the other surface 120, thereby creating a net heat flux between the surfaces, up the ETD thermal gradient. Heat can then be harvested from the warmer surface 120 via standard heat transfer mechanisms (i.e., convection, conduction, radiation). The net result constitutes a thermal (heat) diode which favors heat transfer in one direction over the other, thus enabling net transfer of heat against a temperature gradient. Although specific embodiments are described below in which the dissociation reaction is endothermic, it should be noted that in some embodiments, the dissociation reaction is exothermic. In such embodiments, the surface that favors dissociation 140 will be warmer than the surface that favors recombination.

Structure of an ETD Cell

Figure 1B:
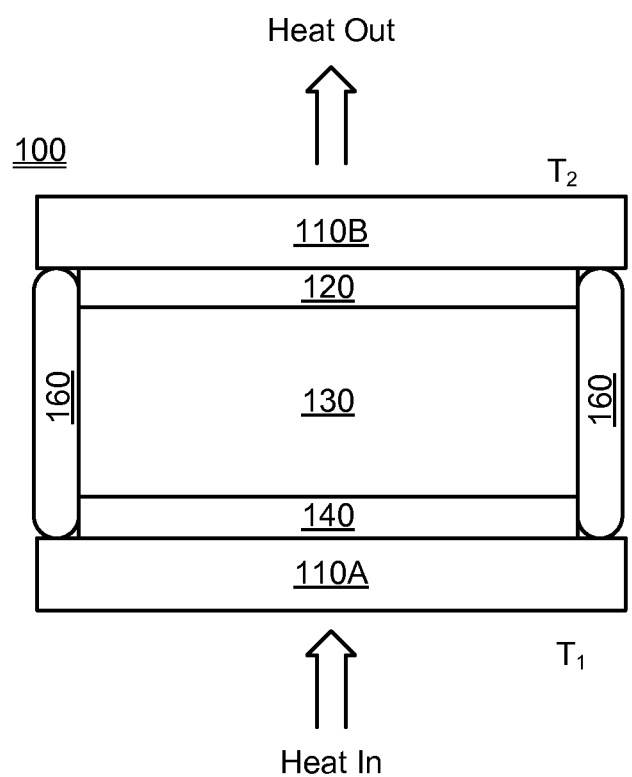
FIG. 1B is a side-view of a single ETD cell in which the reaction of FIG. 1A may occur, according to one embodiment.

FIG. 1B is a cutaway side-view illustrating the general structure of an ETD cell 100, according to one embodiment. Multiple ETD cells 100 can be combined in various ways to achieve desired effects, some examples of which are discussed in greater detail below, with reference to FIGS. 2 and 3. In the embodiment shown, the ETD cell 100 includes a first surface 140 and a second surface 120, each supported by a corresponding heat transfer surface 110 and aligned substantially parallel to each other. Separation between the surfaces 120 & 140 is maintained by a plurality of separators 160, of which two are shown. Thus, a cavity 130 is formed between the surfaces 120 & 140, which contains the gas. In other embodiments, other geometries that maintain a substantially constant separation between two or more surfaces are used for the ETD cell 100, such as nested cylinders, nested spheres, spirals, and the like. In some embodiments, one or both of the surfaces 120 & 140 also serve as the corresponding heat transfer surface 110. In yet further embodiments, the surfaces 120 & 140 are not arranged with substantially constant separation, for example, at an angle of 45 degrees relative to one another, or with one of the surfaces being substantially curved relative to the other.

Gases useful with the disclosed apparatus are those which exist as a dimer, AB, but also as individual monomers, A and B. Further, the gases useful with the disclosed apparatus are selected based on their interaction with the specific surfaces 120 and 140. As disclosed above, a gas useful with particular surfaces 120 and 140 is one that is predisposed to dissociation at the first of the two surfaces as compared to the second and predisposed to recombination at the second surface as compared to the first. In one embodiment, the gas is chosen based on the stability of the individual monomers A and B, the strength of bond between the components in the dimer AB, and the vapor pressure of the gas at the operating temperature of the ETD device (e.g., at or near room temperature).

In some embodiments, the gas is selected such that the vapor pressure of the gas is sufficient for the chemical cycle to operate when the gas is at the ETD's operating temperature. In other words, there must be enough of the gas in the vapor phase crossing the cavity 130 for a dissociation/recombination cycle, and hence temperature differential, to be maintained. Thus, gases with relatively low molecular weight (e.g., less than about 200 amu) can be used in some embodiments intended for room temperature operation. Such gases have net intermolecular forces and energies that are comparable to ambient thermal energies, and thus, an appreciable amount of dissociation occurs in ambient conditions. In general, with gasses of higher molecular weight, a significant proportion of the molecules tend to liquefy or solidify at room temperature, resulting in the cavity 130 not containing a sufficient amount of the gas in the vapor phase for the reaction cycle to be maintained.

In some embodiments, the stability of the individual monomers and the strength of bond of the dimer for the selected gas are such that the surface effects due to the surfaces 120 & 140 dominate over gas phase equilibrium behavior when the ETD device is at the operating temperature. In these embodiments, the dimer AB is bonded by a relatively weak bond, such that the dimer can thermally dissociate at or near room temperature, resulting in an appreciable amount (e.g., 10%) of the gas existing in the dissociated species at any given time. In various embodiments, gas dimers with hydrogen bonds (HyB), halogen bonds (HaB), and van der Waals bonds (vdWB) are used. Both homodimers (gases where monomers A and B are the same) and heterodimers (gases where monomers A and B are different) are used in various embodiments.

Hydrogen bonded dimers are molecules comprising two monomers joined with one or more hydrogen bonds. Hydrogen bonded dimers for which dissociation and recombination rates vary in proximity to a surface (and thus can be used in an epicatalytic process) include, but are not limited to: low molecular weight carboxylic acids, alcohols, aldehydes, ketones, ethers, esters, acyl halides, amides, and amines. In general, lone pair electrons available from F, O, N, and sometimes S, working in concert with hydrogen atoms attached to electronegative elements will result in a dimer that exhibits epicatalytic behavior when in proximity to appropriate surfaces. Those skilled in the art will recognize that in various applications, based on the above considerations, embodiments may employ as the gas: formic acid, acetic acid, methanol, ethanol, formaldehyde, ammonia, dimethyl ketone, methylamine, dimethylamine, dimethyl ether, water, acetamide, methylthiol, cyanogens, hydrogen cyanide, hydrogen fluoride, hydrogen sulfide, cyanomethane, formamide, aminomethanimine, hydrogen chloride, cyanoethane, carbon monoxide, carbon dioxide, sulfur dioxide, and nitrogen oxides, as well as heterodimer combinations of the monomers of these molecules.

Halogen bonded dimers are molecules comprising two monomers joined with one or more halogen bonds. Generally, low molecular weight halogen bonded molecules containing Fluorine, Chlorine, Bromine, or Iodine exhibit epicatalytic behavior. Those skilled in the art will recognize that in various applications, based on the above considerations, embodiments may employ as the gas: mono-halogen methane, di-halogen methane, tri-halogen methane, tetra-halogen methane, halogenated ethane, and halogenated versions of the hydrogenated species above, as well as heterodimer combinations of the monomers of these molecules.

Van der Waals bonded dimers are molecules comprising two monomers joined with one or more Van der Waals bonds. Unlike the HyB and HaB dimers above, many types of Van der Waals bonded dimers exhibit an appreciable amount of dissociation significantly below room temperature. Those skilled in the art will recognize that in various applications, based on the above considerations, embodiments may employ as the gas: noble gas dimers (e.g., Argon, Xenon), methane, ethane, propane, and nitrogen.

In various embodiments, depending on the specific environment, application, and choice of surface materials, gases other than those listed above are used. For example, some covalently bonded gases, such as di-borane and nitrogen tetroxide, have bonds that are weak enough for a significant proportion of the gas to be in the dissociated state when at or near room temperature. Although the gas is described herein as a dimer for convenience, it should be noted that in some embodiments the gas is a trimer or higher-order molecule comprising multiple monomers bound by one or more of the bond types described above.

In some embodiments, additional factors are taken into account when selecting a gas for the cavity 130 including the chemical properties of the gas, the availability/price of the gas, the toxicity of the gas, and the like.

The heat transfer surfaces 110 give mechanical stability and support to the surfaces 120 and 140. The heat transfer surfaces 110 are also impermeable to the gas and make up part of a sealed container that retains the gas. In some embodiments, one or both of the surfaces 120 & 140 also serve as the corresponding heat transfer surface 110. In typical applications, an ETD system contains a plurality of ETD cells 100, with the individual cells sharing the gas throughout a plurality of connected cavities 130. One such system is described in further detail below, with reference to FIG. 2.

The outer surfaces of the heat transfer surfaces 110 include, in various embodiments, surface features (e.g., fins, roughness, etc.) in order to increase heat transfer via conduction and convection. Additionally, the outer surfaces are, in some embodiments, faced (e.g., painted black) in order to maximize heat transfer via radiation. For example, the outer surfaces can include one or more of anodized aluminum, carbon black, carbon nanotube forests, and the like, in order to provide efficient radiative heat transfer into and out of the cell 100.

In some embodiments, the heat transfer surfaces 110 are thermally conductive (e.g., having a high thermal conductivity and being physically thin) and mechanically strong. Examples of materials with these properties include mylar, kevlar, aramid, metal foil, and the like. Being thermally conductive allows heat to easily enter the ETD cell 100 through the first heat transfer surface 110A, and be harvested from the ETD cell at the second heat transfer surface 110B. Being mechanically strong allows the heat transfer surfaces 110 to provide good mechanical support of the surfaces 120 & 140, thus ensuring that the functional geometry of the ETD cell 100 is substantially maintained under stress. The heat transfer surfaces 110 may be constructed from identical or different materials with the desired properties, depending on the specific embodiment. For example, the material used for each heat transfer surface 110 can be chosen to ensure effective binding with the corresponding surface material.

In one embodiment, the heat transfer surfaces 110 are macroscopically flexible, as well as being mechanically strong over shorter length scales. Consequently, a sheet of ETD cells can be manipulated to form cylinders, spirals, wrappings, and other such structures, as desired for a particular application.

In another embodiment, the heat transfer surfaces have low emissivity on the inner facing surfaces (e.g., mirrored) to reduce back radiative heating of the cooler surface 140 by the warmer surface 120. In another embodiment, the relationship between the emissivities (and absorptivities) of the heat transfer surfaces 110 and the surfaces 120 & 140 is optimized to further reduce the amount of back radiative heating achieved by mirroring alone.

The choice of materials for the surfaces 120 & 140 is based, at least in part, by the specific gas in the cavity 130, and in particular, how the dissociation/recombination reaction rates of the specific gas is altered by proximity to the chosen materials for the surfaces. As referenced above, with reference to FIG. 1A, a material that favors dissociation of the gas is selected for the first surface 140. Conversely, a material that (relatively) favors recombination of the gas is selected for the second surface 120. In some embodiments, the geometry of one or both surfaces 120 and 140 is tailored to increase the number of interactions between the gas and surface, and hence increase the corresponding dissociation or recombination rate. For example, the surface 120 or 140 may be rippled, grooved, roughened, dendritic, or otherwise configured (e.g., coated in a carbon nano-tube forest) to increase the surface area available for gas-surface interaction. In one such embodiment, the geometry of the pair of surfaces 120 and 140 is tailored such that the proportion of incoming dimers that dissociate at the dissociating surface is approximately equal to the proportion of monomer pairs that recombine and the recombination surface.

In embodiments where HyB and/or HaB gases are used, the material used for the dissociating surface 140 competes with the monomers of the gas for attraction, thus reducing the number of monomers that recombine proximate to the dissociating surface and consequently increasing the overall dissociation rate. However, if the dissociating surface 140 interacts too strongly with the monomers they may stick to the surface. If this occurs, the monomers become unavailable to participate in the chemical cycle, which can prevent the establishment of a steady-state temperature differential. Thus, the material used for the dissociating surface 140 should be one that has appreciable dissociative desorption activity with respect to the particular dimer used, meaning both that an appreciable portion of dimers incident on the surface dissociate and an appreciable portion of the resulting monomers leave the region proximate to the surface. Ideally, all dimers incident on the dissociating surface 140 undergo dissociative desorption. However, practical systems typically have a dissociative desorption ratio (the percentage of incident dimers for which dissociation occurs and the resulting monomers leave the region proximate to the dissociating surface 140) of less than 100%. In one embodiment, the dissociative desorption ratio is between 0.01% and 90%. In another embodiment, the dissociative desorption ratio is between 0.1% and 90%. In yet another embodiment, the dissociative desorption ratio is between 0.1% and 50%. In a further embodiment, the dissociative desorption ratio is between 0.1 and 10%. In other embodiments, other dissociative desorption ratios occur, depending on the specific gas and materials used, as well as the ETD operating temperature and pressure.

Example material classes that exhibit this property include (but are not limited to): metals, ceramics, metal oxides, nitrides, and halides, as well as functionalized organic polymers and other high molecular mass molecules that exhibit functionalized surfaces. Those skilled in the art will recognize that in various applications, based on the above considerations, embodiments may employ as the dissociating surface 140: noble metals (e.g., Au, Ag), transition metals (e.g., Fe, Ni, Cu), refractory metals (e.g., W, Re, Mo), alumina (Al2O3), magnesia (MgO), titania (TiO2), silica, nitrocellulose, aramid, nylon, rayon, or polymethylmethacrylate (PMMA).

In embodiments where vdWB gases are used, the dissociating surface 140 also interacts with the gas such that the gas dissociates proximate to the dissociating surface at a greater rate than it does proximate to the recombining surface 120. Those skilled in the art will recognize that in various applications, based on the above considerations, embodiments may employ as the dissociating surface 140: surface-chlorinated polyethylene, surface-chlorinated polypropylene, or Teflon.

Another class of materials that are used as the dissociating surface 140 in some embodiments that use vdWB, HaB, or HyB gases is doped semiconductors. By doping a semiconductor with electronegative or electropositive species, sites are created that strongly interact with the monomers that make up a dimer, increasing the adsorption rate, and thus increasing the rate of dissociation. Examples of such doped semi-conductors include silicon and germanium doped with one or more of: chlorine, fluorine, nitrogen, oxygen, barium, and caesium.

In various embodiments, depending on the specific environment, application, and selection of gas, materials other than those listed above are used for the dissociating surface 140.

The recombining surface 120 facilitates recombination of the monomers back into dimers, thus, the material selected for the recombining surface interacts with the monomers in a manner that favors recombination, e.g., by influencing the distribution of the charge of the monomers. In some embodiments, the recombining surface 120 binds the monomers lightly, e.g., by weak HyB, HaB, or VdWB. Consequently, interactions between gas monomers and the recombining surface 120 do not dominate over the formation of bonds between the monomers, thereby creating dimers. Similar to the dissociating surface 140, in an ideal system, 100% of monomers that are incident on the recombining surface 120 combine to make dimers that then leave the region proximate to the recombining surface. However, practical systems typically have a recombinative desorption ratio (the percentage of incident monomers for which recombination occurs and the resulting dimer leaves the region proximate to the recombining surface 120) of less than 100%. In one embodiment, the recombinative desorption ratio is between 0.01% and 90%. In another embodiment, the recombinative desorption ratio is between 0.1% and 90%. In yet another embodiment, the recombinative desorption ratio is between 0.1% and 50%. In a further embodiment, the recombinative desorption ratio is between 0.1 and 10%. In other embodiments, other recombinative desorption ratios occur, depending on the specific gas and materials used, as well as the ETD operating temperature and pressure.

General classes of materials that exhibit these properties include (but are not limited to) non-polar, organic surfaces, such as high molecular weight hydrocarbons, organosilanes, chloro-polymers, and unfunctionalized polymers. Those skilled in the art will recognize that in various applications, based on the above considerations embodiments may employ, as the recombining surface 120: polyethylene, polypropylene, paraffin, natural rubber, or polyethers.

In addition, many fluoropolymers exhibit suitable properties for use as the recombining surface 120, including homopolymers and co-polymers fabricated from: ethylene, propylene, vinyl fluoride, vinylidene fluoride, tetrafluoroethylene, hexafluoropropylene, perfluoropropylvinylether, perfluoromethylvinylether, and chlorotrifluoroethylene. Those skilled in the art will recognize that in various applications, based on the above considerations embodiments may employ, as the recombining surface 120: polyvinylfluoride, polyvinylidene fluoride, polytetrafluoroethylene, perfluoroalkoxy polymer, polyethylenechlorotrifluoroethylene, Viton, perfluoropolyether, or perfluorosulfonic acid. Further, graphene and its allotropes (e.g., graphite, carbon nanotubes) also exhibit these properties and can be used for the recombining surface 120, in combination with an appropriate gas.

Another class of materials that are used as the recombining surface 120 in some embodiments that use vdWB, HaB, or HyB gases is doped semiconductors. By doping a semiconductor with electronegative or electropositive species, sites are created that interact with the monomers in a manner that encourages recombination. Examples of such doped semiconductors include silicon and germanium doped with one or more of: chlorine, fluorine, nitrogen, oxygen, barium, and caesium In various embodiments, depending on the specific environment, application, and selection of gas, materials other than those listed above are used for the recombining surface 120.

In one embodiment, the separation between the surfaces 120 & 140 is less than (or of the order of) the mean free path for collision or reaction for the gas-phase dissociation-recombination reaction (AB⇌+B). For example, for gas pressures of about 0.01-10 atmospheres, corresponding separations in the range of about 10-0.01 microns can be used. In other embodiments, gas pressures as low as 0.001 and as high as 40 atmospheres are used, corresponding to separations in the range of about 100-0.0025 microns.

In addition, the surfaces 120 & 140 have a high thermal conductivity and are physically thin (e.g., 1-10 nm) in order to aid the transfer of heat in and out of the ETD cell 100. In some embodiments, the surfaces 120 & 140 have a high surface area (e.g., rough or dendritic) to maximize chemical reactivity per unit area and are optically thin (e.g., less than IR wavelength) so that the optical character of the heat transfer surfaces 110 dominates radiation transfer in the interior of the ETD cell 100.

Figure 3:
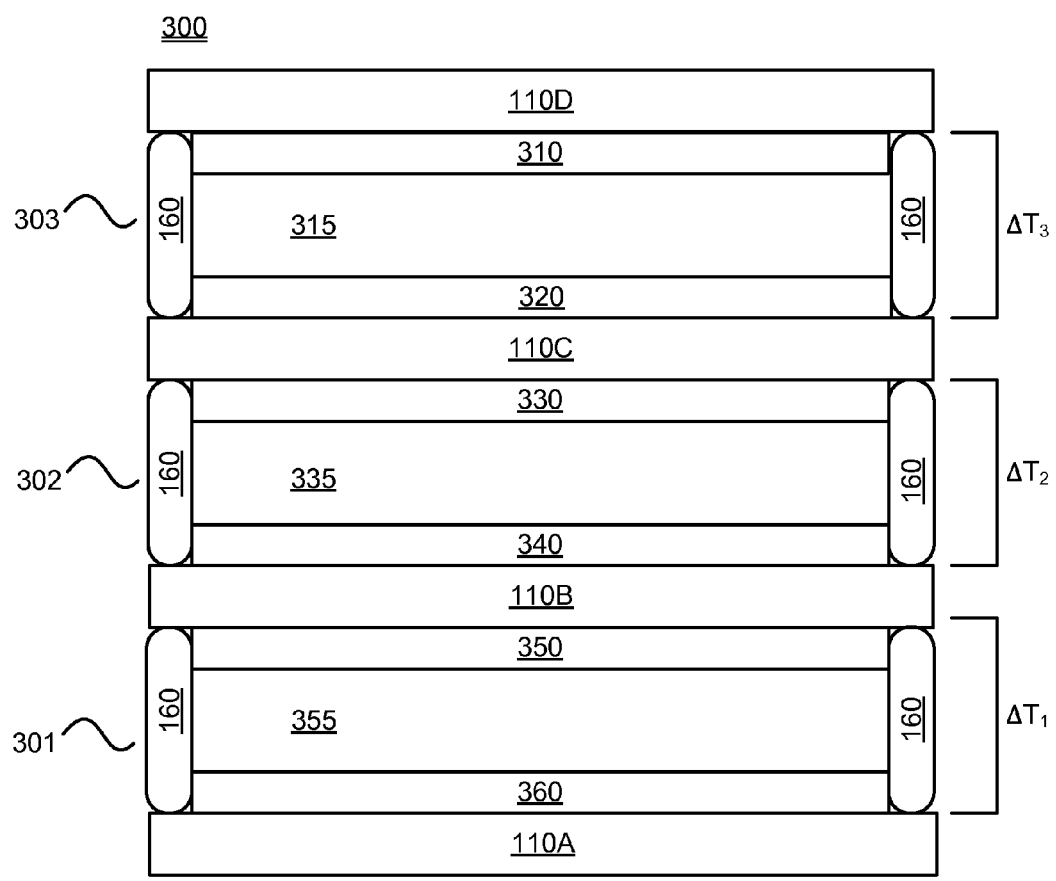
FIG. 3 is side-view representation of a system configuration combining three layers of ETD cells in series, according to one embodiment.

The plurality of separators 160 maintains the desired separation between the active surfaces 120 & 140. The material and structure of the separators 160 are selected to keep the amount of thermal conduction across the cavity 130, via the separators, as low as possible. In the embodiment shown in FIG. 1B, this is accomplished by using separators 160 that are thin columns with rounded tips to minimize the area of contact with the heat transfer surfaces 110. In other embodiments, different shaped separators 160 are used, such as spherical micro-particles. Although in the embodiment shown, the separators 160 abut the heat transfer surfaces 110, in other embodiments the separators abut and/or are embedded in the surfaces 120 & 140 (e.g., as shown in FIG. 3).

The separators 160 are mechanically strong enough and adequately spaced to maintain the separation between the surfaces 120 and 140 at close to the desired value when the ETF cell 100 is stressed. The separators 160 also have a low thermal conductivity to minimize thermal back-conduction from the cooler surface 120 to the warmer surface 140. In addition, the separators 160 have low emissivity (e.g., mirror-like) so as to not absorb internal radiation.

In one exemplary embodiment, the gas in the cavity 130 is acetic acid, the dissociating surface 140 is polymethyl methacrylate, and the recombining surface 120 is polyethylene. In another exemplary embodiment, the gas is formamide, the dissociating surface 140 is partially surface-chlorinated polyethylene, and the recombining surface 120 is polypropylene. In a further exemplary embodiment, the gas is ammonia, the dissociating surface 140 is alumina ceramic, and the recombining surface 120 is polystyrene. In yet another exemplary embodiment, the gas is formic acid, the dissociating surface 140 is polymethyl methacrylate, and the recombining surface 120 is polyethylene.

Determining Gas-Surface Combinations

Figure 4:
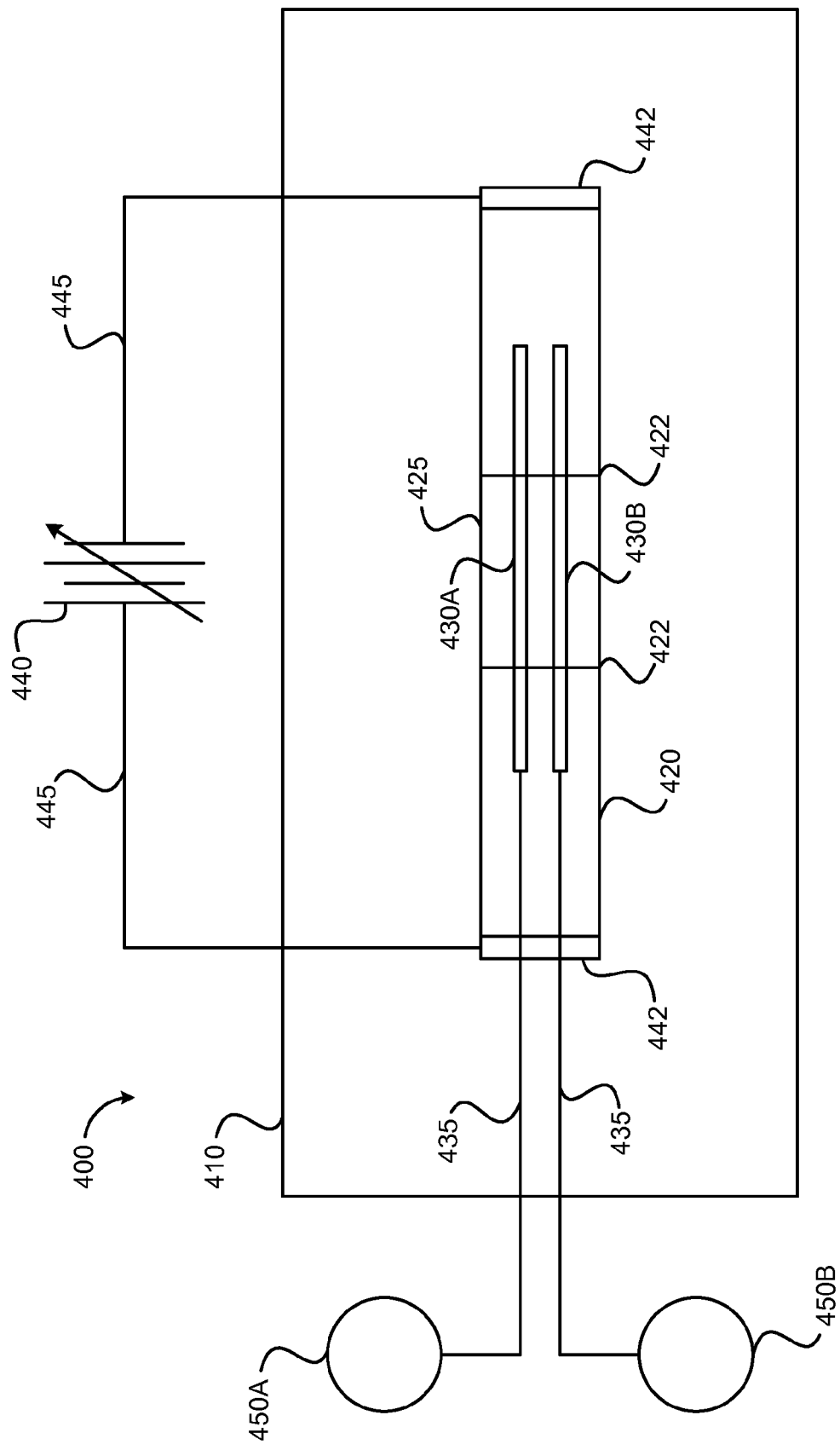
FIG. 4 is diagram illustrating an apparatus for testing combinations of materials and gasses to determine their suitability for use in an ETD cell, according to one embodiment.

FIG. 4 illustrates an apparatus 400 for testing combinations of materials and gasses to determine their suitability for use in an ETD cell, according to one embodiment. The apparatus 400 includes a black body cylinder 420 inside a vacuum vessel 410. In one embodiment, the body of the vacuum vessel 410 is a stainless steel cylinder with a diameter of approximately 30 centimeters (cm) and a length of approximately 40 cm, and the black body cylinder 420 is a cylinder with a diameter of approximately 0.64 cm and a length of approximately 10 cm constructed from tungsten or rhenium foil (with a thickness of approximately 26 microns). The vacuum vessel is diffusion pumped to a base pressure of approximately $10^{-6}$ Torr. An inner portion 425 of the black body cylinder 420 (e.g., the central 2.5 cm portion) is sealed off with a pair of alumina discs 422.

In the embodiment illustrated in FIG. 4, a cylindrical electrode 442 (e.g., a tantalum electrode) is attached to the interior surface of each end of the black body cylinder 420. The electrodes 442 are attached to a variable power supply 440 via a pair of wires 445. By applying a current to the black body cylinder 420 using the variable power supply 440, the black body cylinder and its contents can be ohmically heated. The equilibrium temperature of the black body cylinder 420 and its contents (absent any epicatalytic effects) can thus be controlled by varying power supplied by the variable power supply 440. In other embodiments, where the apparatus 400 is designed to be used to find room-temperature epicatalytic combinations, some or all of the variable power supply 440, wires 445, and electrodes 442 are omitted. In yet other embodiments, mechanisms for refrigerating the black body cylinder 420 are provided to enable the testing of materials for low temperature epicatalytic behavior.

A pair of thermocouples 430 are positioned inside the black body cylinder 420 and fed through the holes in the alumina discs 422 such that a central portion of each thermocouple 430 is located within the inner portion 425. The first thermocouple 430A is coated with a material that is a candidate for being predisposed to the dissociation half-reaction with respect to a particular gas, and the second thermocouple 430B is coated with a material that is a candidate for being predisposed to the recombination half-reaction (relative to the first material) with respect to the same gas. Each thermocouple is connected to a corresponding thermocouple gauge 450 via a wire 435. Thus, the thermocouple gauge 450A connected to the first thermocouple monitors the temperature of the first thermocouple, and the second thermocouple gauge 450B monitors the temperature of the second thermocouple. For example, the thermocouple gauges 450 might be a pair of channels on a data-logger that will monitor and record the temperature of the thermocouple once a second.

Inside the black body cavity 420, the thermocouples 430 are subject to four heat transfer channels: 1) heat conduction along the wires 435, 2) black body radiation, 3) heat convection by gasses present in the cavity, and 4) gas dissociation/recombination reactions (i.e., epicatalytic effects). Thus, in order to determine whether an observed temperature differential between the thermocouples is due (at least in part) to epicatalysis, the system should be tested for any differentials due to the other three channels.

Figure 5:
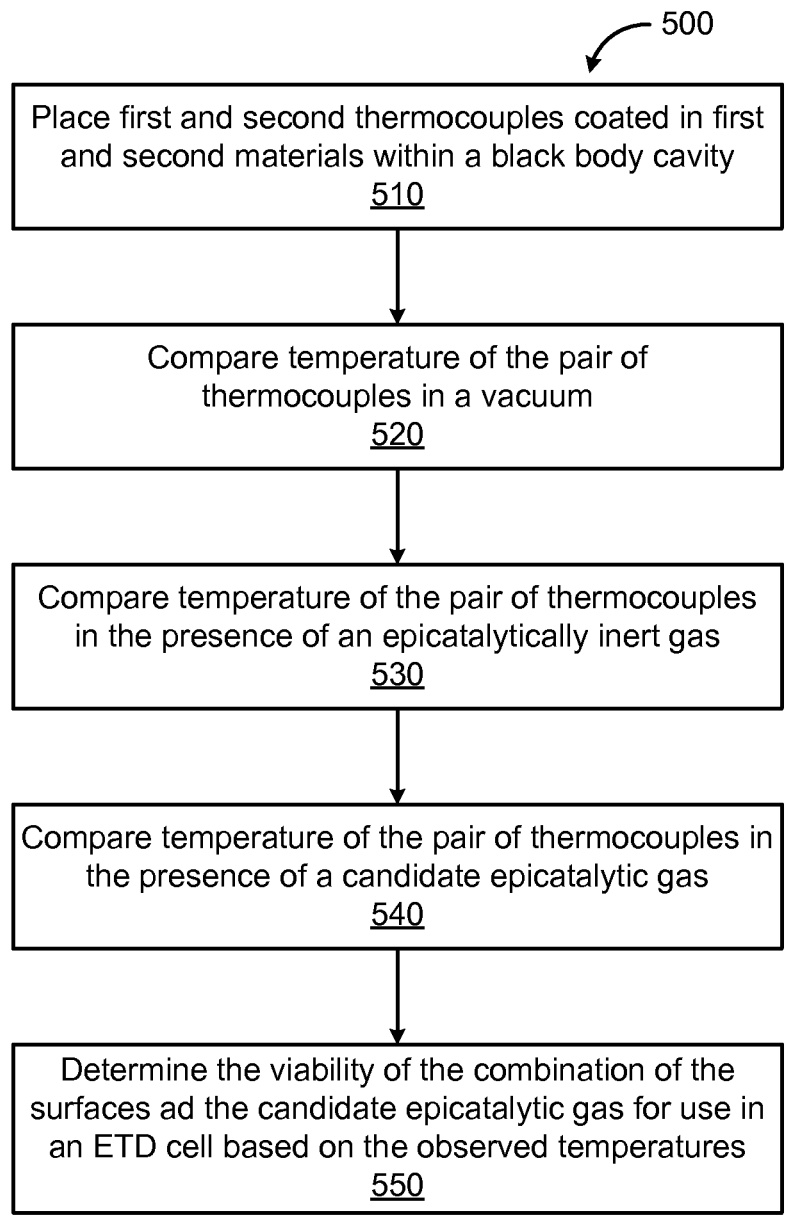
FIG. 5 is a flow chart illustrating an exemplary method of determining the suitability of a particular gas-surfaces combination for use in an ETD cell, according to one embodiment.

FIG. 5 illustrates an exemplary method 500 of determining the suitability of a particular gas-surfaces combination for use in an ETD cell, according to one embodiment. In the paragraphs that follow, the method 500 is described from the perspective of the method being performed using the apparatus 400 shown in FIG. 4. However, in other embodiments, different testing apparatus are used. In various embodiments, some of the steps of the method 500 are performed in a different order and/or in parallel. Some embodiments of the method 500 include additional and/or different steps.

At 510, the pair of thermocouples 430 are placed within the black body cylinder 420. As described above with reference to FIG. 4, the first thermocouple 430A is coated with a first candidate material and the second thermocouple 430B is coated with a second candidate material.

At 520, the vacuum vessel 410 is evacuated (e.g., to a pressure of $10^{-6}$ Torr) and the temperature of the pair of thermocouple 430 is monitored until equilibrium is reached. For example, the temperature may be monitored until no variations greater than a threshold value (e.g., 0.1%) are observed for a set period of time (e.g., one minute). If the material-gas combination is being tested for a target temperature of operation other than room temperature, power is provided to the variable power supply 440 in order to ohmically heat the system. As the thermocouples 430 are located within a black body cavity in a vacuum, any variations in temperature must be due to either heat conduction along the wires 435 or black body radiation, or both. Theory and experiment confirm that under these conditions, no difference in temperature between the pair of thermocouples 430 is observed.

At 530, an epicatalytically inert gas (meaning one that does not undergo a significant number of dissociation and recombination reactions when in equilibrium at the target temperature) is inserted into the vacuum vessel 410. The inert gas is preferably one with similar properties to the candidate epicatalytic gas that is to be tested in order to minimize the possibility that non-epitcatalytic effects are responsible for any observed temperature difference. For example, if the candidate epicatalytic gas being tested is Hydrogen, then Helium may be used during this stage of the method 500. Assuming that the inert gas does not exhibit epicatalytic behavior in the presence of the candidate materials, any variations in the temperature of the thermocouples 430 that is observed as compared to step 520 will be due to heat convection by the inert gas (and any other trace gasses) present in the black body cylinder 420. Theory and experiment confirm that under these conditions, no difference in temperature between the pair of thermocouples 430 is observed.

At 540, the inert gas in the vacuum vessel 410 is replaced with the candidate epicatalytic gas. If the candidate epicatalytic gas preferably dissociates proximate to the first thermocouple 430A relative to the second thermocouple 430B (or vice versa), a steady-state temperature differential will result as described previously. Thus, a temperature differential will be observed between the thermocouples 430 that was previously not present (in steps 520 and 530). Theory and experiment have verified this behavior. For example, when Tungsten and Rhenium thermocouples 430 are exposed to Hydrogen gas at high temperature and low pressure (e.g., at a temperature of 1900 Kelvin (K) and a pressure of 1 Torr), the Tungsten thermocouple 430A is observed to spontaneously heat relative to the Rhenium thermocouple 430B, and the observed temperature difference is thermodynamically stable.

At 550, the viability of using the candidate epicatalytic gas and the candidate materials to construct an ETD cell is determined based on the observed temperatures. Any combination that exhibits a large temperature differential in step 540 that was not present in in steps 520 and 530 can be used to construct a working ETD cell. In general, combinations with larger temperature differentials will result in more efficient ETD cells with greater power densities, within the other constraints imposed by the specific properties of the materials. For example, if the candidate materials have particularly low tensile strength, this may limit the size and possible geometries of the ETD cell. As another example, if a particular combination requires heating to an elevated temperature to operate, this will reduce the net efficiency of the ETD cell, as power must be expended heating the system. As a result, a combination that exhibits a lower temperature differential may result in an ETD cell that is more efficient or convenient overall.

Using the method 500, material and gas combinations can be easily tested for epicatalytic behavior. In some embodiments, more than two candidate materials can be concurrently tested with a given gas by including additional thermocouples 430 within the black body cylinder 420. Additionally, candidate materials can similarly be compared to materials known to be epicatalytically inert with respect to the given gas by including one or more thermocouples 430 coated with such inert materials.

Figure 6:
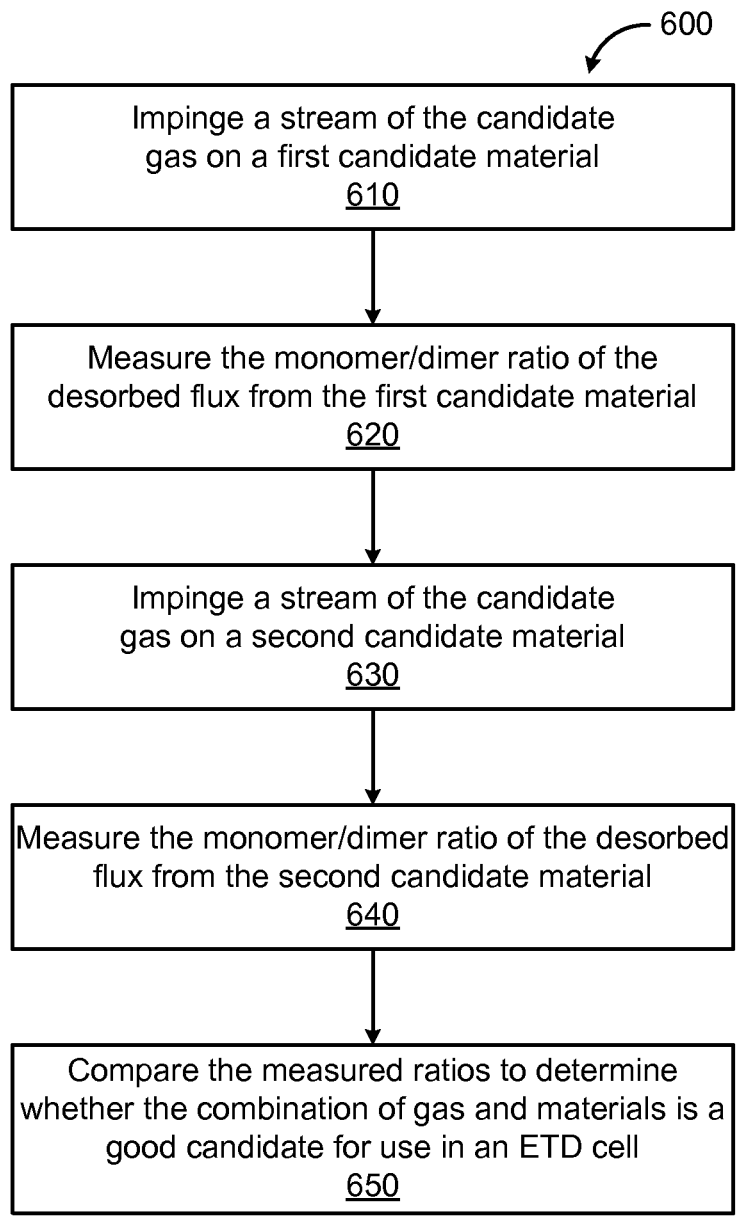
FIG. 6 is a flow chart illustrating an alternate method for determining the suitability of a particular gas-surface combination for use in an ETD cell, according to one embodiment.

FIG. 6 illustrates an alternate method 600 for determining the suitability of a given combination of gas, dissociating surface material, and recombining surface material, for use in an ETD cell 100, according to one embodiment. In various embodiments, some of the steps of the method 600 are performed in a different order and/or in parallel. Some embodiments of the method 600 include additional and/or different steps.

At 610, a stream of a candidate gas is directed onto a first candidate material. In one embodiment, this is done in an ultra-high vacuum chamber, with a pristine sample of the first candidate material being subjected to a stream of the candidate gas, the stream including dimer and monomeric species of the candidate gas. As used herein, a pristine sample is one that has been cleaned as much as possible. In other embodiments, non-pristine samples are used.

The gas stream impinges on the sample of the first candidate material, adsorbs onto the sample, chemically and/or physically reacts with the sample, and leaves (desorbs). At 620, the monomer/dimer ratio of the desorbed flux leaving the first candidate material is measured. In one embodiment, the desorbed flux is analyzed by a mass spectrometer. In other embodiments, other diagnostic tools suitable for quantitatively identifying the desorbed species are used.

At 630, a stream of the candidate gas is impinged on a second candidate material. In one embodiment, this is done in an ultra-high vacuum chamber, with a pristine sample of the second candidate material being subjected to a stream of the candidate gas, the stream including dimer and monomeric species of the candidate gas. In other embodiments, non-pristine samples are used.

The gas stream impinges on the sample of the second candidate material, adsorbs onto the sample, chemically and/or physically reacts with the sample, and leaves (desorbs). At 640, the monomer/dimer ratio of the desorbed flux leaving the second candidate material is measured. In one embodiment, the desorbed flux is analyzed by a mass spectrometer. In other embodiments, other diagnostic tools suitable for quantitatively identifying the desorbed species are used.

At 650, the measured monomer/dimer ratios are compared to determine whether the particular combination of gas and materials is suitable for use in construction of an ETD cell 100. Desorbed fluxes that demonstrate monomer fractions in excess of gas phase equilibrium values make good dissociation surfaces 140, for the particular gas. Conversely, desorbed fluxes that demonstrate monomer fractions less than or equal to those of gas phase equilibrium values make good recombination surfaces 120, for the particular gas. In various embodiments, the combination of the particular gas and pair of candidate materials is considered to be suitable for use in construction of an ETD cell 100 if the difference between the monomer fraction measured for each surface is greater than a threshold amount. The threshold used is selected based on the desired minimum temperature difference between the surfaces for the embodiment, with greater temperature differences requiring a greater difference, and hence a greater threshold. In some such embodiments an upper threshold is also used to place an upper limit on the difference in monomer fractions in order to filter out combinations that create temperature differences large enough to cause thermal damage to the ETD cell 100 and/or surrounding objects.

The above method 600 can be repeated for a plurality of combinations of gas and pairs of materials to determine those combinations which can be used in constructing an ETD cell 100 (other considerations, such as structural and economic feasibility aside).

Exemplary Test Data

Experiments conducted using the method 500 shown in FIG. 5, using the apparatus of FIG. 4, confirm that a steady-state temperature differential can be established between a pair of surfaces in the present of a epicatalytically active gas. The hydrogen dimer $H_2$ was simultaneously tested against tungsten (W) and rhenium (Re) coated thermocouples at temperatures in the range 300 K to 1950 K, with gas pressures of up to approximately 10 Torr. For temperatures in excess of 1700 K, a distinct steady-state temperature differential developed between the W and Re coated thermocouples, evidencing the ETD effect. The maximum steady-state ETD temperature difference measured was 126 K, which was observed at an average temperature of 1950 K and a pressure of 1 Torr.

Based on energy scaling arguments, it is inferred that a steady-state temperature differential can be established and maintained at room temperature. Chemical equilibrium constants (Keq)—upon which all standard chemistry is based—depend on temperature and reaction Gibbs free energy ($K_{eq}=\exp[-G/RT]$), to which the dominant contribution is usually the bond energy for the reaction. In such cases, the characteristic energy scale ($\phi$) for chemical equilibrium is given by the ratio of bond energy to thermal energy, i.e., $\phi=\Delta G/RT$. Thus, weaker bonds require commensurately lower temperatures to achieve similar levels of dissociation and desorption.

Hydrogen bonds (~0.5 eV) are typically an order of magnitude weaker than covalent bonds (~5 eV), and van der Waals bonds are typically an order of magnitude weaker still (~0.05 eV). Thus, because covalent epicatalysis of $H_2$ operates well at 2000 K, it follows that epicatalytic dissociation of hydrogen-bonded and van der Waals-bonded dimers should occur at or below room temperature. For example, because the ratio $\phi$ (4.5 eV/2000 K), where 4.5 eV is the approximate bond strength of a Hydrogen dimer, is approximately equal to the ratio $\phi$ (0.5 eV/220 K), where 220 K is well below room temperature, it can be inferred that a Hydrogen bonded dimer can easily exhibit epicatalytic behavior at room temperature in the presence of an appropriate pair of surfaces.

Additional experimental and theoretical details regarding steady-state temperature differentials between a pair of epi-catalytic surfaces can be found in the following publications, which are incorporated herein in their entirety.

Sheehan, D. P., D. J. Mallin, J. T. Garamella, and W. F. Sheehan, Experimental test of a thermodynamic paradox, Found. Phys. 44 235 (2014).

Sheehan, D. P., Nonequilibrium heterogeneous catalysis in the long mean-free-path regime, Phys. Rev. E 88 032125 (2013).

Sheehan, D. P., J. T. Garamella, D. J. Mallin and W. F. Sheehan, Steady-state nonequilibrium temperature gradients in hydrogen gas-metal systems; Challenging the second law of thermodynamics, Phys. Scr. T151 014030 (2012).

It should be noted that a similar phenomenon is also found to occur in certain types of plasma, known as surface ionized plasmas. Such plasmas can establish steady-state pressure gradients under blackbody conditions. Surface ionized plasmas are created, as the name suggests, by a surface which ionizes a gas via strong gas-surface interactions. Many surface ionized plasmas exhibit strongly non-linear features, such as non-Maxwellian beamlike ion velocities, which can in turn lead to a steady-state pressure and temperature differentials. Thus, an ETD cell may also be constructed in which energy is transported across a cavity between an ionizing surface and a surface that is less active with respect to plasma ionization.

Additional experimental and theoretical details regarding steady-state pressure differentials in surface ionized plasmas can be found in the following publications, which are incorporated herein in their entirety.

Sheehan, D. P. and T. Seideman, Intrinsically biased electrocapacitive catalysis; J. Chem. Physics 122 204713 (2005).

Sheehan, D. P. and J. D. Means, Minimum requirement for second law violation: A paradox revisited; Phys. Plasmas 5 2469 (1998).

Sheehan, D. P., Another paradox involving the second law of thermodynamics; Phys. Plasmas 3 104 (1996).

Sheehan, D. P., A paradox involving the second law of thermodynamics; Phys. Plasmas 2 1893 (1995).

Exemplary Systems Using Multiple ETD Cells

Figure 2:
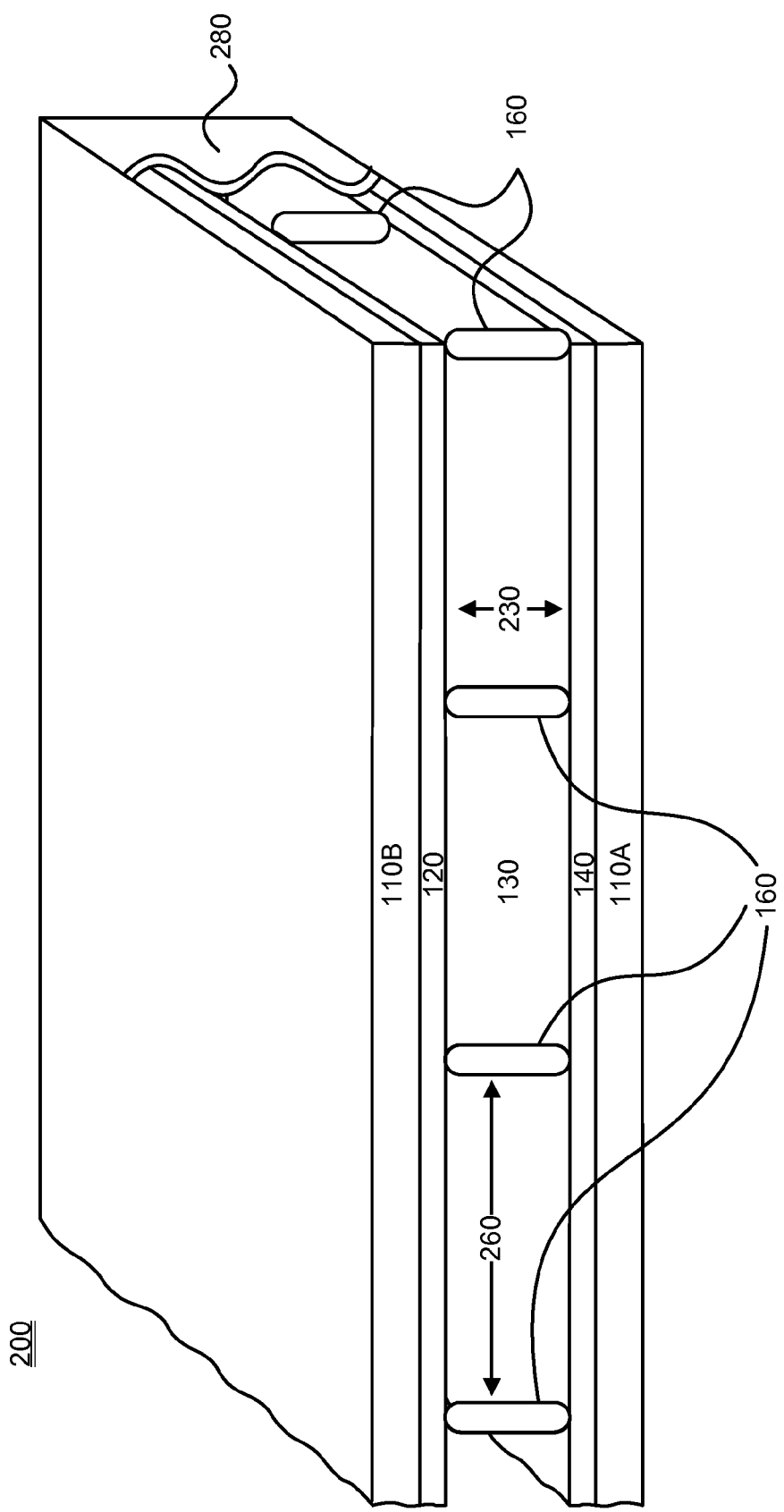
FIG. 2 is an isometric view of a system configuration including multiple ETD cells in parallel, according to one embodiment.

FIG. 2 is an isometric view of a system configuration 200 including multiple ETD cells 100 in parallel, according to one embodiment. FIG. 2 shows a section of an ETD sheet that is three ETD cells 100 wide and two ETD cells 100 deep, for illustrative purposes only. In practice, ETD sheets will contain many more (e.g., hundreds, thousands, or even millions of) ETD cells 100. When ETD cells 100 are arranged in parallel, the heat flux across the system 200 increases, but the temperature differential between the two sides of the cells remains unchanged. This is analogous to arranging cells in an electric circuit in parallel, where the currents add, but the voltage is unchanged.

In the embodiment shown, the surfaces 120 & 140 as well as the heat transfer surfaces 100 expand across multiple ETD cells 100. This is beneficial for production, as the ETD sheet can be constructed layer by layer, using methods known in the art. In addition, adjacent cells share separators 160 (thus, each separator is logically part of four ETD cells 100). As described previously, with reference to FIG. 1B, a single cavity 130 is shared by all (or at least some) of the ETD cells 100 in the sheet. The heat transfer surfaces 110 are joined at the edges of the sheet with end walls 280 using gas-tight seals. Thus, the combination of the heat transfer surfaces 110 and end walls 280 make a sealed container that prevents the gas from escaping the cavity 130. In one embodiment, a valve (not shown) is provided between the cavity 130 and the exterior of the ETD device to enable insertion and/or replacement of the gas.

The separators 160 maintain a substantially constant separation 230 between the surfaces 120 & 140 throughout the sheet. In various embodiments, depending on the environment and specific application, the separation 230 is selected from the range of about 0.01 microns to about 100 microns. In the embodiment shown, the separators 160 are equally spaced by a distance 260. Reducing the number of separators 160 increases the available surface area of the surfaces 120 & 140 at the expense of less regularity in the surface separation 260. Consequently, the distance 260 is selected based on the specific application's requirements and the rigidity of the materials used for the surfaces 120 & 140 and the heat transfer surfaces 110. In various embodiments, the distance 260 is selected from the range of about 0.1 microns to about 1,000 microns. In other embodiments, the distance 260 may be different in one direction than the other and/or non-rectilinear configurations (e.g., hexagonal cells) are used. In yet further embodiments, micro-particles (e.g., spherical nano-beads) are used as the separators 160 and they are randomly or semi-randomly dispersed in the cavity 130. This has the benefit of requiring less fine control during the manufacturing process.

FIG. 3 is side-view representation of a system configuration 300 combining three layers of ETD cells 100 in series, according to one embodiment. Although each layer is shown as being a single ETD cell 100, in practice, each layer can comprise many (e.g., hundreds, thousands, or even millions of) ETD cells arranged in parallel, as described above with reference to FIG. 2. The choice to show three layers is purely for illustrative purposes. The principles described herein can be used to stack any number of layers. The individual layers are in good thermal contact with the adjoining layers. When ETD cells 100 are arranged in series, the temperature differentials of the cells are additive, but the heat flux across the system 200 is unchanged. This is analogous to arranging cells in an electric circuit in series, where the voltages add, but the current is unchanged.

In the embodiment shown, adjacent layers share a heat transfer surface 110, such that the top heat transfer surface of one layer also serves as the bottom heat transfer surface of the layer above it, and vice versa. In the embodiment shown, the bottom layer 301 has two surfaces 350 & 360 and a cavity 355 containing a first gas. Thus, the bottom layer 301 results in a first temperature difference $\Delta T_1$ across it. The materials used for the surfaces 350 and 360 as well as the first gas are selected to optimize the system's operation when the input heat transfer surface 110A is at an expected operating temperature.

The middle layer 302 also has two surfaces 330 & 340 and a cavity 335 containing a second gas. Thus, the middle layer 302 results in a second temperature difference $\Delta T_2$ across it. In one embodiment, the materials and gas used for the middle layer 302 are the same as those used in the bottom layer 301. In other embodiments, the materials used for the surfaces 330 & 340 as well as the second gas are selected to optimize the system's operation when the first internal heat transfer surface 110B is at an expected operating temperature, based on the expected operating temperature of the input heat transfer surface 110A and $\Delta T_1$.

The top layer 303 also has two surfaces 310 & 320 and a cavity 315 containing a third gas. Thus, the top layer 303 results in a third temperature difference $\Delta T_3$ across it. In one embodiment, the materials and gas used for the top layer 303 are the same as those used in the bottom layer 301 and/or middle layer 302. In other embodiments, the materials used for the surfaces 310 & 320 as well as the third gas are selected to optimize the system's operation when the second internal heat transfer surface 110C is at an expected operating temperature, based on the expected operating temperature of the input heat transfer surface 110A as well as $\Delta T_1$ and $\Delta T_2$.

Consequently, the system configuration 300 as a whole provides a temperature differential between the input heat transfer surface 110A and an output heat transfer surface 110D of $\Delta T_1+\Delta T_2+\Delta T_3$, which can be significantly larger than the temperature differential obtained by any one of the layers 301-303.

Additional Considerations

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for an ETD that creates a steady-state temperature differential. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. An epicatalytic thermal diode cell, comprising:
 a first surface that chemically interacts with a gas such that the gas dissociates at a first rate proximate to the first surface;
 a second surface that chemically interacts with the gas such that the gas dissociates at a second rate proximate to the second surface, the second surface substantially parallel to the first surface, and the second rate lower than the first rate, wherein the second surface is made from at least one material selected from the group consisting of: polyethylene, polypropylene, paraffin, natural rubber, doped silicon, polyethers, polyvinylfluoride, polyvinylidene fluoride, polytetrafluoroethylene, perfluoroalkoxy polymer, polyethylenechlorotrifluoroethylene, Viton, perfluoropolyether, and perfluorosulfonic acid, graphene, graphite, and carbon nano-tubes; and
 a plurality of separators located between the first surface and the second surface, the plurality of separators maintaining a separation between the first surface and the second surface of substantially a constant distance;
 wherein the first and second surfaces define a cavity configured to contain the gas, and the difference between the first rate and the second rate results in a steady-state temperature differential across the cavity between the first surface and the second surface.

2. The epicatalytic thermal diode cell of claim 1, wherein the first surface is made from at least one material selected from the group consisting of: magnesium, aluminum, scandium, titanium, vanadium, chromium, manganese, iron, cobalt, nickel, copper, zinc, yttrium, zirconium, molybdenum, ruthenium, rhodium, palladium, silver, tin, lanthanum, cerium, praseodymium, neodymium, samarium, europium, gadolinium, hafnium, doped silicon, tantalum, tungsten, rhenium, osmium, iridium, platinum, gold, mercury, lead, alumina, magnesia, titania, silica, nitrocellulose, aramid, nylon, rayon, and polymethylmethacrylate.

3. The epicatalytic thermal diode cell of claim 1, wherein the gas comprises at least one gas selected from the group consisting of: formic acid, acetic acid, methanol, ethanol, formaldehyde, ammonia, dimethyl ketone, methylamine, dimethylamine, dimethyl ether, hydronium hydroxide (water), acetamide, methylthiol, cyanogens, hydrogen cyanide, hydrogen fluoride, hydrogen sulfide, cyanomethane, formamide, aminomethanimine, hydrogen chloride, cyanoethane, nitrogen, carbon monoxide, carbon dioxide, sulfur dioxide, nitrogen oxides, mono-halogen methane, di-halogen methane, tri-halogen methane, tetra-halogen methane, halogenated ethane, hydrogen, helium, neon, argon, krypton, zenon, radon, methane, ethane, and propane.

4. The epicatalytic thermal diode cell of claim 1, wherein the constant distance is in a range of 0.01 to 100 microns.

5. The epicatalytic thermal diode cell of claim 1, further comprising a first heat transfer surface connected and substantially parallel to the first surface on an opposite side of the first surface than the cavity, the first heat transfer surface configured to conduct heat from outside of the epicatalytic thermal diode cell to the first surface.

6. The epicatalytic thermal diode cell of claim 5, further comprising a second heat transfer surface connected and substantially parallel to the second surface on an opposite side of the second surface than the cavity, the second heat transfer surface configured to conduct heat out of the epicatalytic thermal diode cell from the second surface.

7. An epicatalytic thermal diode device comprising a plurality of epicatalytic thermal diode cells as described in claim 1 connected in parallel, wherein the cavities of the plurality of epicatalytic thermal diode cells are interconnected and adjacent epicatalytic thermal diode cells share at least one separator.

8. An epicatalytic thermal diode device comprising a plurality of epicatalytic thermal diode cells as described in claim 1 connected in series, wherein adjacent epicatalytic thermal diode cells are separated by a shared heat transfer surface, the shared heat transfer surface configured to transfer heat between the adjacent epicatalytic thermal diode cells.

9. The epicatalytic thermal diode cell of claim 1, wherein the gas dissociates at the first rate on the first surface and the gas dissociates at the second rate on the second surface.

10. The epicatalytic thermal diode cell of claim 1, wherein the first and second surfaces have been cleaned.

11. The epicatalytic thermal diode cell of claim 1, further comprising an amount of the gas located within the cavity, the amount of the gas selected such that the gas is at a pressure in a range of 0.01 to 10 atmospheres.

12. The epicatalytic thermal diode cell of claim 11, wherein the gas is purified.

13. A method for creating and maintaining a temperature differential, comprising:

providing a first surface that chemically interacts with a gas such that the gas dissociates at a first rate proximate to the first surface;

providing a second surface that chemically interacts with the gas such that the gas dissociates at a second rate proximate to the second surface, the second surface substantially parallel to the first surface, the second rate lower than the first rate, the first and second surfaces defining a cavity;

providing a plurality of separators located between the first surface and the second surface, the plurality of separators maintaining a separation between the first surface and the second surface of substantially a constant distance;

cleaning the first and second surfaces; and after cleaning the first and second surface, providing an amount of the gas in the cavity;

wherein the difference between the first rate and the second rate results in the temperature differential across the cavity between the first surface and the second surface.

14. The method of claim 13, wherein the first surface is made from at least one material selected from the group consisting of: ruthenium, rhodium, palladium, silver, osmium, iridium, platinum, gold, scandium, cadmium, titanium, hafnium, doped silicon, vanadium, tantalum, chromium, tungsten, manganese, rhenium, iron, osmium, cobalt, iridium, nickel, copper, zinc, yttrium, zirconium, niobium, molybdenum, ruthenium, rhodium, palladium, alumina, magnesia, titania, silica, nitrocellulose, aramid, nylon, rayon, and polymethylmethacrylate.

15. The method of claim 13, wherein the second surface is made from at least one material selected from the group consisting of: polyethylene, polypropylene, paraffin, natural rubber, doped silicon, polyethers, polyvinylfluoride, polyvinylidene fluoride, polytetrafluoroethylene, perfluoroalkoxy polymer, polyethylenechlorotrifluoroethylene, Viton, perfluoropolyether, and perfluorosulfonic acid, graphene, graphite, and carbon nano-tubes.

16. The method of claim 13, wherein the gas comprises at least one gas selected from the group consisting of: formic acid, acetic acid, methanol, ethanol, formaldehyde, ammonia, dimethyl ketone, methylamine, dimethylamine, dimethyl ether, hydronium hydroxide (water), acetamide, methylthiol, cyanogens, hydrogen cyanide, hydrogen fluoride, hydrogen sulfide, cyanomethane, formamide, aminomethanimine, hydrogen chloride, cyanoethane, nitrogen, carbon monoxide, carbon dioxide, sulfur dioxide, nitrogen oxides, mono-halogen methane, di-halogen methane, tri-halogen methane, tetra-halogen methane, halogenated ethane, helium, hydrogen, neon, argon, krypton, zenon, radon, methane, ethane, and propane.

17. The method of claim 13, further comprising:
providing a first heat transfer surface connected and substantially parallel to the first surface on an opposite side of the first surface than the cavity, the first heat transfer surface configured to conduct heat from outside of the epicatalytic thermal diode cell to the first surface.

18. The method of claim 17, further comprising:
providing a second heat transfer surface connected and substantially parallel to the second surface on an opposite side of the second surface than the cavity, the second heat transfer surface configured to conduct heat out of the epicatalytic thermal diode cell from the second surface.

19. The method of claim 13, wherein the gas dissociates at the first rate on the first surface and the gas dissociates at the second rate on the second surface.

20. The method of claim 13, wherein the amount of the gas located within the cavity results in a pressure in a range of 0.01 to 10 atmospheres.

21. The method of claim 13, further comprising purifying the gas prior to providing the gas.

22. An epicatalytic thermal diode device comprising a plurality of epicatalytic thermal diode cells connected in parallel, each epicatalytic thermal diode cell comprising:

a first surface that chemically interacts with a gas such that the gas dissociates at a first rate proximate to the first surface;

a second surface that chemically interacts with the gas such that the gas dissociates at a second rate proximate to the second surface, the second surface substantially parallel to the first surface, and the second rate lower than the first rate; and a plurality of separators located between the first surface and the second surface, the plurality of separators maintaining a separation between the first surface and the second surface of substantially a constant distance;

wherein:
the first and second surfaces define a cavity configured to contain the gas;
the difference between the first rate and the second rate results in a steady-state temperature differential across the cavity between the first surface and the second surface;
the cavities of the plurality of epicatalytic thermal diode cells are interconnected; and
adjacent epicatalytic thermal diode cells share at least one separator.

23. The epicatalytic thermal diode device of claim 22, further comprising a first heat transfer surface connected and substantially parallel to the first surface on an opposite side of the first surface than the cavity, the first heat transfer surface configured to conduct heat from outside of the epicatalytic thermal diode cell to the first surface.

24. The epicatalytic thermal diode device of claim 23, further comprising a second heat transfer surface connected and substantially parallel to the second surface on an opposite side of the second surface than the cavity, the second heat transfer surface configured to conduct heat out of the epicatalytic thermal diode cell from the second surface.

25. The epicatalytic thermal diode device of claim 22, wherein the constant distance is in a range of 0.01 to 100 microns.

26. The epicatalytic thermal diode device of claim 22, further comprising an amount of the gas located within the cavity, the amount of the gas selected such that the gas is at a pressure in a range of 0.01 to 10 atmospheres.

27. An epicatalytic thermal diode system comprising a plurality of epicatalytic thermal diode devices as described in claim 22 connected in series, wherein adjacent epicatalytic thermal diode devices are separated by a shared heat transfer surface, the shared heat transfer surface configured to transfer heat between the adjacent epicatalytic thermal diode devices.

* * * * *